Sept. 30, 1930.    J. V. PUGH    1,777,223
VEHICLE WHEEL
Filed Nov. 22, 1926    3 Sheets-Sheet 1

J. V. Pugh
INVENTOR

By: Marks & Clerk
Attys.

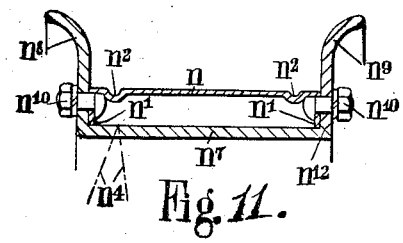
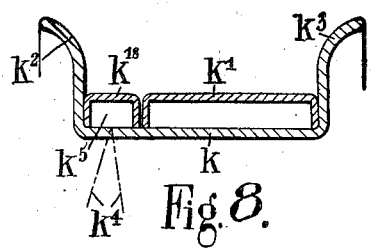
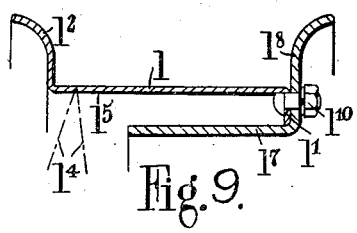
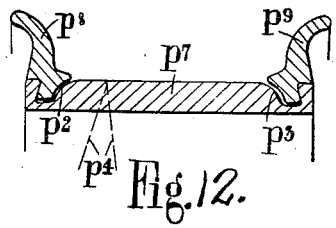
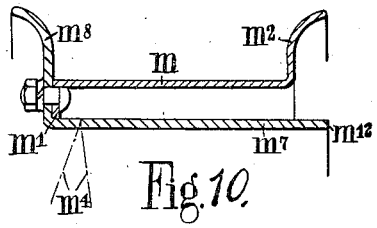

Sept. 30, 1930.   J. V. PUGH   1,777,223
VEHICLE WHEEL
Filed Nov. 22, 1926   3 Sheets-Sheet 3

INVENTOR:
J. V. Pugh
BY Marks & Clerk
ATTORNEYS.

Patented Sept. 30, 1930

1,777,223

UNITED STATES PATENT OFFICE

JOHN VERNON PUGH, OF COVENTRY, ENGLAND, ASSIGNOR TO RUDGE-WHITWORTH, LIMITED, OF COVENTRY, ENGLAND

VEHICLE WHEEL

Application filed November 22, 1926, Serial No. 150,093, and in Great Britain November 30, 1925.

This invention relates to vehicle wheels of the kind in which the hub and rim are maintained in the desired relationship to one another by means of tensioned wire spokes and such spokes are so disposed as to free or leave available a large proportion of the total width of the rim on the side adjacent to the vehicle in order to accommodate a brake drum and other fittings in addition or alternatively thereto.

The object of the present invention is to provide improved and simplified forms of such wheels and the fittings associated therewith.

The invention consists in a wire spoke wheel in which the spoking is carried from the hub to a region of the rim which is remote from the vehicle and friction brake surfaces in rotational engagement with the rim are provided in the space adjacent the unspoked portion thereof.

The invention further consists in a wheel in accordance with the preceding paragraph in which a friction brake surface is provided on the wheel rim itself in the form of a circular band or belt of the surface unoccupied by the spoking.

The invention further consists in a wheel as indicated in which a friction brake surface is provided upon a band of metal of suitable thickness fastened more or less permanently to the remainder of the rim section.

The invention further consists in a wheel in accordance with the preceding paragraph in which the fastening is effected by the act of spoking the wheel.

The invention further consists in a wheel having a braking surface in accordance with either of the preceding paragraphs in which free ventilation is provided between the metal of the normal section of the rim and the metal of the band providing the friction surface.

The invention further consists in the provision of rims and associated fittings for forming wire spoke wheels in accordance with any of the preceding paragraphs.

The invention also consists in improvements in wire spoke wheels and in rims and other elements for building the same as hereinafter described.

Referring now to the accompanying drawings:—

Figure 8 is an arrangement in which a trough section providing the friction surface is supported upon the spokes and has filling for supporting the tyre;

Figures 9, 10 and 11 show built-up sections in which the friction surface member contributes in some degree in supporting the contact surfaces of the tyre.

Figure 12 is an arrangement where a thickish ring provides the friction surface and supports the tyre-retaining flanges;

Figure 1:
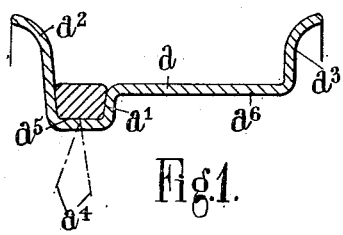
Figures 1 and 2 show two simple forms in which a single rim member provides both the friction surface and the tyre-supporting surface.

The invention may be carried into effect in many ways and in the simple and convenient form illustrated in Figure 1 a wheel hub (not shown in the drawing) and a wellbase rim $a$ having the well $a'$ positioned at one side of the rim adjacent to the flange $a^2$ are connected by two rows of spokes shown by centre lines $a^4$ which pass from the two ends of the hub to perforations of a known kind in the bottom $a^5$ of the well $a'$, the well being upon that side of the rim which will be remote from the vehicle when the wheel is in use.

The foregoing arrangement provides a free internal cylindrical surface $a^6$ upon the whole of that part of the rim which lies between the side of the well $a'$ and the edge or flange $a^3$ of the rim upon the opposite side thereto and this free surface is available for the friction brake surface and is provided with expanding shoes, band or other devices (not shown in the drawing) capable of co-operating therewith to retard the movement of the wheel.

Figure 2:
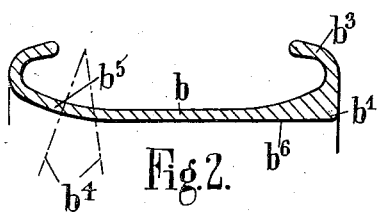

Instead of a well-base rim a beaded-edge rim $b$ as shown in Figure 2 may be treated in the manner last described, the section preferably being specially formed so that the customary rounded corner on the side adjacent to the vehicle is filled up to form a right angle $b'$ and provides a plain internal cylindrical surface $b^6$ from the edge $b^3$ of the rim adjacent the vehicle to some distance past the central plane of revolution of the rim. The rounded portion $b^5$ of the rim remote from the vehicle is provided with perforations and depressions to take the nipples (not shown) of spokes $b^4$ in about the same relative position that they are located in the last-described form.

Figure 3:
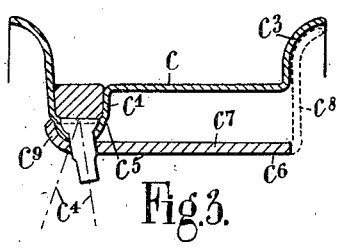

In the foregoing constructions the material of the rim must be of sufficient thickness to act as a brake ring or friction surface but as an alternative design a well-base rim $c$ may be made as shown in Figure 3 of such thickness as is necessary for supporting the tyre only and a separate ring $c^7$ for the brake may be provided which covers at $c^9$ the bottom region $c^5$ of the well $c'$ where the spokes $c^4$ pass through both thicknesses of metal, while the ring extends as a plain cylinder $c^6$ to the other edge of the rim where it may terminate or if desired it may be turned up as shown dotted at $c^8$ to abut against the other rim flange $c^3$ and be attached thereto by rivets or other fastening means, washers being provided between the surfaces of the parts $c^5$ and $c^9$ if desired to secure ventilation of the portion between the rim $c$ itself and the brake ring $c^7$ or if desired portions of the flange of the brake ring may be cut away so as to only leave projecting arms at $c^8$ which may be attached to the rim flange as already described.

Figure 4:
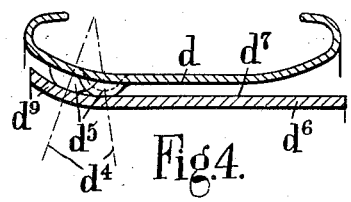
Figures 3 and 4 show a rim constructed of two main members one of which provides the friction surface and the other supports the tyre.

The foregoing construction with slight modification may be applied to a beaded-edge rim $d$ as shown in Figure 4, the brake ring $d^7$ taking the form of a plain cylinder $d^6$ for a greater part of its width but being rounded up at $d^9$ on the side remote from the vehicle so as to bed upon the reverse sides or exteriors $d^5$ of the depressions formed in the wheel rim for the nipple heads. In this case the cylindrical brake ring $d^7$ may extend as shown towards the vehicle as far as the adjacent edge of the tyre rim and if desired attachment means upon this side also may be provided as described in connection with Figure 3 or they may be omitted. The brake ring $d^7$ and the tyre rim $d$ are retained in their relative positions by the cylindrical parts of the spoke nipples as shown in Figure 3 which pass therethrough.

Figure 5:
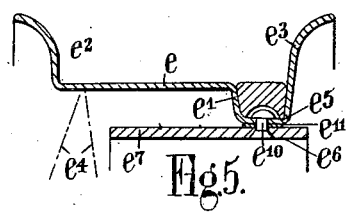
Figures 5, 6 and 7 show other rim structures in which two main elements are employed and the spokes are connected to the tyre-supporting member.

As an alternative to the well-base rim construction shown in Figure 3, the well $e'$ as shown in Figure 5 may be positioned upon the side of the rim $e$ adjacent to the vehicle and the spoking $e^4$ may be carried to the other side of the rim and kept adjacent to the flange $e^2$ upon that side. A plain cylindrical brake ring $e^7$ is provided and attached by rivets $e^{10}$ or the like to the bottom $e^5$ of the well $e'$, the rivets $e^{10}$ being countersunk upon the inner side of the brake band so as to provide a smooth internal cylindrical surface $e^6$ and washers $e^{11}$ being preferably introduced between the brake ring $e^7$ and the tyre rim well bottom $e^5$ such washers tending to eliminate vibration and noise.

Figure 6:
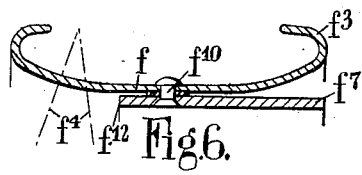

A construction similar to that last described may also be adopted with a beaded-edge rim $f$ as shown in Figure 6, the riveting $f^{10}$ or like attachment being carried round upon the central plane of the wheel rim $f$ and the plain cylindrical brake ring $f^7$ extending in width from under the inner edge $f^3$ of the tyre rim outward to $f^{12}$ some distance past the central plane thereof and adjacent the spokes $f^4$.

Figure 7:
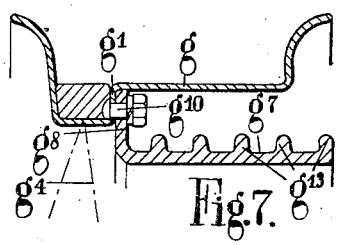
Figure 13:
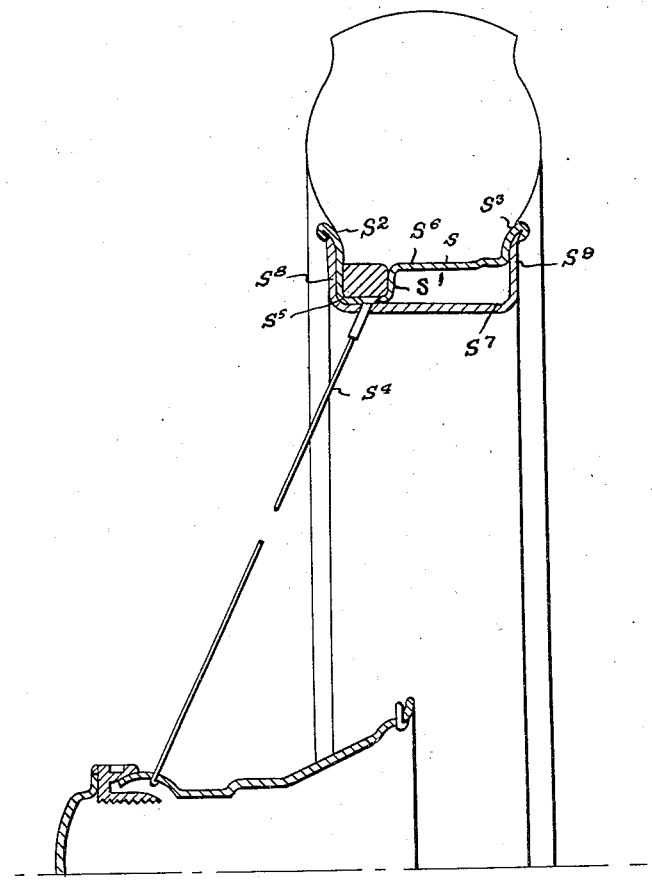
Figure 13 is a fragmentary sectional view through a wheel showing the hub and spokes and another trough section on the lines of Figure 8 but with the spokes passing through both the filling and the trough member.

In another construction employing a well-base rim of normal section the brake ring $g^7$ may as shown in Figure 7 be in the form of a hollow cylinder having an out-turned flange $g^8$ at one end thereof and the cylinder may be stiffened if desired by the addition of a plurality of small circumferential ribs $g^{13}$ parallel with the before-mentioned flange $g^8$ and distributed between it and the other edge of the brake ring.

The out-turned flange $g^8$ is of a diameter which will just pass into the plain cylindrical portion $g$ on the well-base rim and it is passed therethrough until it abuts against the edge or side $g'$ of the well which is nearest to the vehicle. The flange $g^8$ is attached to the side $g'$ of the well by bolts $g^{10}$ or like fastening means passing through the two thicknesses of material.

In another form shown in Figure 8 a perfectly symmetrical channel $k$ is employed for the brake drum and the upstanding edges of the channel form the lips or flanges $k^2$, $k^3$ of the rim holding a wired-on tyre. The trough in the channel is filled up more than half-way across by any of the usual filling devices but preferably made as a flanged ring $k'$ of thin steel. This can be regarded as permanent filling, and together with the channel forms a rim with a well base $k^5$ at one side. This as in other cases of rims having well bases at one side is filled up after the tyre has been got on to the rim say by a smaller flanged ring $k^{18}$.

In a further modification shown in Figure 9 a tyre rim $l$ may be formed of special section of a suitable strength for receiving the tyre and spoking, the section consisting of a flat cylindrical base $l^5$ with an ordinary outwardly curved tyre positioning flange $l^2$ upon one side thereof and a narrower inturned flange $l'$ at the other side.

The spoking $l^4$ is situated closely adjacent to the outwardly-turned flange $l^2$ upon the side which will be remote from the vehicle. The brake ring takes the form of a cylindrical band $l^7$ of suitable thickness for braking purposes and adapted to pass through the inner edge of the narrow inturned flange $l'$ and it is provided with an out-turned flange $l^8$ wide enough to abut against the narrow flange $l'$ of the tyre rim $l$ and then to project at the side of the tyre rim for a distance corresponding with the flange $l^2$ upon the other side of the said tyre rim, both flanges of the tyre rim having the same contour where they co-operate with the sides of the tyre. The brake ring $l^7$ is attached to the tyre rim $l$ by bolts $l^{10}$ passing through the narrow flange $l'$ of the tyre rim and the inner region of the flange $l^8$ of the brake ring.

A construction as shown in Figure 10 similar to the foregoing may be adopted and the cylindrical part $m^7$ of the brake ring may be given a greater width so that it projects at $m^{12}$ as far as the rounded-over outer edge of the flange $m^2$ of the tyre rim $m$. In this case the wheel is fitted to the vehicle with the join between the flange $m'$ of the tyre rim and the flange $m^8$ of the brake ring upon the side farthest from the vehicle and the spokes $m^4$ pass through and are attached to the brake ring $m^7$ adjacent to the flange $m^8$ thereof, the remainder of the ring $m^7$ being employed as the braking surface.

Both of the foregoing constructions give the equivalent of a detachable flange rim. In the first the brake drum comes away with the detachable flange and in the second the brake drum is left while the tyre rim comes away in one piece with the tyre.

In the various constructions described the thicknesses of the material will be apportioned to the particular duty which is to be performed and where the material acts as a brake drum it is possible that its thickness should not be less than about ⅛ of an inch. If the rim has spokes and nipples attached to it, even if it does not act as a brake drum, the thickness should probably not be less than about .08 of an inch, while in a rim which serves merely as a tyre seat and has neither brake drum nor spoking functions to perform, the thickness might be reduced to about .04 of an inch.

In another modification shown in Figure 11 a cylindrical region $n^7$ adapted to act as a brake ring may be provided at the edge which is to be remote from the vehicle with an outwardly turned flange $n^8$ of a width sufficient to accommodate a tyre and provide an additional depth approximating to the depth of a well in a well-base rim. The other edge of the cylindrical brake ring $n^7$ is chamfered upon its outer surface at $n^{12}$ for a width corresponding to the thickness of the material and a separate flange $n^9$ similar to the flange $n^8$ formed upon the other side is provided to fit upon this chamfered portion. In the space between the two flanges is positioned a ring $n$ of light section with inturned flanges $n'$ at each edge thereof, the internal diameter of these inturned flanges being such that the ring will slide easily on to the exterior of the plain cylindrical braking ring $n^7$ the cylindrical part of this ring $n$ forming a support for the edges of the tyre at the correct distance below the outer edges of the main flanges. The tyre-supporting ring $n$ is fastened say by bolts $n^{10}$ to the main flanges $n^8$ and $n^9$ at each side and ridges $n^2$ may be formed therein to form a retaining means for the bolt heads, see Figure 11. Instead of a bolt $n^{10}$ on each side a longer bolt which will pass right across the width of the rim and through the flanges may be used and the ridges $n^2$ may be omitted or any other suitable means for retaining the flange $n^9$ may be employed.

In the two forms, Figures 1 and 2, first described the tyre is situated upon the same material which provided the braking surface, and in vehicles fitted with four-wheel brakes where the maximum temperature reached by the brake drum is less than in other cases, such arrangements are quite suitable. It may also be convenient as shown in Figure 15 to form the brake ring $p^7$ as a band of sufficient thickness to carry the spoking $p^4$ and to provide at each edge means such as inclined grooves $p^2$ and $p^3$ into which detachable flanges $p^8$ and $p^9$ of the split type may be fitted. Such flanges may be provided with additional fastening means for the ends as is the case in many well-known constructions.

In another form shown in Figure 16 the cylindrical region $s^7$ adapted to form the braking ring is provided with two outwardly extending flanges $s^8$ and $s^9$ one at each side and of width sufficient to accommodate the tyre and provide an additional depth approximating to the depth of a well in a well-base rim. In the space between the flanges a light section rim $s$ is provided which has a central region $s^6$ of rather smaller diameter and a well $s'$ positioned at one side. The bottom $s^5$ of the well fits snugly over the exterior of the cylindrical portion $s^7$ of the braking ring. The flanges $s^2$ and $s^3$ of the rim $s$ are spun as shown over the edge of the adjacent flanges $s^8$ and $s^9$ of the brake ring $s^7$, a secure connection being thereby obtained. Perforations are provided in the bottom $s^5$ of the well and complimentary perforations are provided in the cylindrical portion of the brake rim $s^7$ though which perforations the spokes $s^4$ pass. The region $s^6$ facilitates tyre fitting since the edges of the tyre are only tight when they are home against the flanges. The filling piece can either be a continuous india-rubber band which is put in place when both edges of the tyre are pushed away from the well or halfway round the wheel the well may be permanently filled up and temporarily filled up by a half ring of wood, cork, rubber or metal. This for convenience may be joined preferably by having holes through and string threaded so that it is like a string of beads or the like.

In several of the forms described intermediate washers such as $e^{11}$ are employed in the fastenings between a brake ring and a tyre rim and in some instances it may be desirable to form such washers of asbestos or other suitable material for the purpose of preventing vibration or noise.

It is to be understood that the forms described are given by way of example and that further modifications and additions may be introduced without in any way departing from the spirit of this invention.

I claim:

1. A wire spoke wheel having in combination a hub and spokes, a ring of thinner section adapted to hold a tyre, a trough-shaped depression situated to one side thereof and a band of metal of greater thickness fastened to the tyre ring section by co-operation with the exterior of said depression and provided with a surface adapted to coact with a friction brake.

2. A wire spoke wheel having in combination a hub and spokes, a ring of thinner section adapted to hold a tyre, a band of metal of greater thickness provided with a surface adapted to coact with a friction brake and spoke nipples penetrating both the thinner and thicker section members for firmly fastening the one to the other.

3. A wire spoke wheel having in combination a hub and spokes, a ring of thinner section adapted to hold a tyre, a trough-shaped depression on one side thereof, a band of metal of greater thickness provided with a surface adapted to coact with a friction brake and spoke nipples penetrating the bottom of said depression and the band of thicker metal for firmly fastening the one to the other.

4. A wire spoke wheel having in combination a hub and rim, sets of tension spokes carried from the hub to a region near that edge of the rim which is remote from the vehicle and a circular friction brake engaging surface carried by the rim positioned in the space between the spokes and the other edge of the rim.

5. A wheel according to claim 4, in which the rim comprises a ring of thinner section adapted to hold a tyre and a separate band of metal of greater thickness fastened to the tyre rim section and providing the surface adapted to coact with a friction brake.

6. A wheel according to claim 4, comprising a ring of channel-shaped section with a plain cylindrical bottom and side flanges curved at the top and two filling platforms for said trough forming a seating for the tyre and one of which extends the greater part of the width of the channel leaving a narrow well on one side which is filled by the other and readily removable platform.

7. A wheel according to claim 4, comprising a ring of channel-shaped section with a plain cylindrical bottom and side flanges curved at the top and two filling platforms for said trough forming a seating for the tyre and one of which extends the greater part of the width of the channel leaving a narrow well on one side which is filled by the other and readily removable platform, in which the wider filling is shaped to provide a region of rather smaller diameter in the centre of the channel and lines the narrow well and the tyre-retaining side flanges, and spoke nipples arranged to pass through the combined thickness of the main trough and the filling which are permanently connected to one another.

8. A wire spoke wheel having in combination a hub and spokes, a ring of thinner section adapted to hold a tyre, a band of metal of greater thickness provided with a surface adapted to coact with a friction brake, means fastening the ring to the band and means distancing the friction surface and tire supporting surface and providing between them an insulating space which may contain air.

In testimony whereof I have signed my name to this specification.

JOHN VERNON PUGH.